(12) United States Patent
Brenndoerfer (10) Patent No.: US 9,868,424 B2
(45) Date of Patent: Jan. 16, 2018

(54) ELECTRONICALLY SLIP-REGULATED VEHICLE BRAKE SYSTEM

(71) Applicant: Robert Bosch GmbH, Stuttgart (DE)

(72) Inventor: Daniel Brenndoerfer, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/159,955

(22) Filed: May 20, 2016

(65) Prior Publication Data

US 2016/0339882 A1 Nov. 24, 2016

(30) Foreign Application Priority Data

May 22, 2015 (DE) .................. 10 2015 209 456

(51) Int. Cl.
| | |
|---|---|
| *B60T 13/66* | (2006.01) |
| *B60T 8/40* | (2006.01) |
| *B60T 7/04* | (2006.01) |
| *B60T 13/14* | (2006.01) |
| *B60T 13/68* | (2006.01) |

(52) U.S. Cl.
CPC .............. *B60T 8/4081* (2013.01); *B60T 7/042* (2013.01); *B60T 13/146* (2013.01); *B60T 13/662* (2013.01); *B60T 13/686* (2013.01); *B60T 2270/403* (2013.01); *B60T 2270/604* (2013.01)

(58) Field of Classification Search
CPC ...... B60T 7/042; B60T 8/4081; B60T 13/662; B60T 13/686

USPC ........ 303/10, 11, 113.1–113.5, 114.1, 116.1, 303/116.2
See application file for complete search history.

(56) References Cited

U.S. PATENT DOCUMENTS

| | | | | |
|---|---|---|---|---|
| 4,753,490 A | * | 6/1988 | Belart ................... | B60T 7/042 303/115.4 |
| 6,464,307 B1 | * | 10/2002 | Yoshino ................. | B60T 7/042 303/11 |
| 8,727,455 B2 | * | 5/2014 | Higuma ................. | B60T 1/10 303/113.4 |
| 8,892,327 B2 | * | 11/2014 | Hachtel ................. | B60T 8/3265 701/32.1 |
| 9,527,486 B2 | * | 12/2016 | Maruo ................... | B60T 8/4081 |

(Continued)

FOREIGN PATENT DOCUMENTS

DE 10 2013 206 324 A1 10/2014

*Primary Examiner* — Christopher Schwartz (74) *Attorney, Agent, or Firm* — Maginot, Moore & Beck LLP (57) ABSTRACT

An electronically slip-regulated vehicle brake system is configured to change from an external force powered operating brake mode into a muscle-powered auxiliary brake mode, and includes a master brake cylinder configured to be operated, a pedal travel simulator configured to simulate an operating travel of the master brake cylinder during the operating brake mode, and a simulator control valve. The simulator includes two pressure chambers. The control valve is configured to control a flow of pressure medium into a first of the two pressure chambers from the master brake cylinder, and is disposed in a return line connecting a wheel brake to a reservoir tank at a position downstream of a connection point at which a second of the two pressure chambers of the simulator is connected to the return line.

8 Claims, 6 Drawing Sheets

(56) References Cited

U.S. PATENT DOCUMENTS

| | | | | |
|---|---|---|---|---|
| 2001/0005100 A1* | 6/2001 | Kamiya | ............... | B60T 7/12 |
| | | | | 303/5 |
| 2005/0162008 A1* | 7/2005 | Bickel | ............... | B60T 8/4081 |
| | | | | 303/113.4 |
| 2005/0162010 A1* | 7/2005 | Kamiya | ............... | B60T 8/409 |
| | | | | 303/113.4 |
| 2012/0228925 A1* | 9/2012 | Baechle | ............... | B60T 7/042 |
| | | | | 303/10 |
| 2014/0008965 A1* | 1/2014 | Ito | ............... | B60T 8/4081 |
| | | | | 303/3 |
| 2014/0375113 A1* | 12/2014 | Higashi | ............... | B60T 13/16 |
| | | | | 303/10 |

* cited by examiner

ELECTRONICALLY SLIP-REGULATED VEHICLE BRAKE SYSTEM

This application claims priority under 35 U.S.C. §119 to patent application no. DE 10 2015 209 456.1, filed on May 22, 2015 in Germany, the disclosure of which is incorporated herein by reference in its entirety.

The disclosure concerns an electronically slip-regulated vehicle brake system.

BACKGROUND

One such vehicle brake system is for example known from DE 10 2013 206 324 A1. Said known vehicle brake system consists of an operating brake in which the brake pressure is produced by external force operation of a pressure generator in combination with muscle power operation of a master brake cylinder by the driver and a muscle power operated auxiliary brake that is activated in the event of a malfunction of the operating brake. The pressure generator is directly connected to a reservoir tank for a pressure medium and as a result is able to boost the brake pressure that is set by the driver. As a result, the known vehicle brake system is especially suitable for vehicles that are powered by an electric motor, a hybrid drive or by a supercharged internal combustion engine, and with which owing to its drive concept no vacuum, or in any case only a small vacuum, can be tapped that could be used for conventional brake force boosting by means of a pneumatic brake force booster. The known vehicle brake system comprises a plurality of brake circuits. A pressure generator and moreover at least one wheel brake are associated with each brake circuit. A pressure modulation device is connected between the pressure generator and each wheel brake, which adapts the pressure in the wheel brake to the slip characteristics at the associated wheel. For this purpose, the pressure modulation device comprises a regulated pressure build-up valve disposed in the brake circuit upstream of the wheel brake and a pressure reducing valve disposed downstream of the wheel brake. Said pressure reducing valves are designed in the form of switching valves that are closed in the normal position. Switching valves are available on the market relatively inexpensively.

With the known vehicle brake system, the driver is always involved in the build-up of brake pressure during operating brake processes and is consequently hydraulically connected to the to wheel brake. Said hydraulic connection causes a loss of comfort, as pressure pulsations in the brake circuit that are triggered by the pressure generator can be detected within the interior of the vehicle by means of the brake pedal that is coupled to the master brake cylinder.

In vehicles with a pure electric motor drive or with a hybrid drive, in which an electric motor and an internal combustion engine are used together as drive sources, so-called regenerative braking processes can be carried out. Said regenerative braking processes include braking processes during which energy recovery is carried out by converting the kinetic energy of the vehicle into electrical energy, which can then be stored in an accumulator. The total braking effect of a corresponding vehicle during said braking processes is comprised of a hydraulic braking torque of the conventional hydraulic brake system and a regenerative brake torque of the electrical drive operated as a generator. By blending the two braking torques, the total braking torque during a braking process can be held constant. However, the regenerative braking depends on the speed of the vehicle. Disadvantageously, owing to the nature of the system the known vehicle brake system is therefore not capable of fully blending the regenerative brake torque with the hydraulic brake torque until the vehicle is at a standstill. This adversely affects the efficiency of the energy recovery.

Fully blending capable, power-assisted brake systems with an electric motor driven plunger as the pressure generator are currently in the development stage. By reversing the direction of motion of said plunger, the wheel brake pressure can be reduced relatively simply and without the involvement of other components, for example of solenoid valves. It is disadvantageous, however, that a plunger only has a structurally limited stroke available to it, or that at the end of said stroke travel a reversal of the direction of motion of the plunger is necessary to maintain the operability thereof. Additional plunger control valves are necessary in this case in order to avoid pressure medium from being sucked out of the wheel brakes as a result of the restoring displacement of the plunger and consequently inadvertently reducing the brake pressure. Plunger control valves are still in the development stage, increase the parts costs and the assembly costs of a hydraulic assembly of such a vehicle brake system, occupy additional installation space and cause a bulky structure of the hydraulic assemblies and a correspondingly high use of raw material for the hydraulic block of the hydraulic assembly.

SUMMARY

The disclosure has by contrast the advantage that a fully blending capable, power-assisted brake system can be presented, the control of which can yet be achieved with a particularly compact and inexpensively constructed hydraulic assembly. The hydraulic assembly is fitted with solenoid valves, the total number of which does not exceed the number of solenoid valves for controlling a conventional, i.e. without brake force recovery, slip-regulated vehicle brake system. As a result, for a vehicle brake system according to the disclosure a hydraulic assembly can be used, the hydraulic block of which substantially corresponds in the dimensions thereof to the hydraulic block of known slip-regulated vehicle brake systems.

A hydraulic assembly of a vehicle brake system according to the disclosure is fitted with a pressure generator, which in the activated state continuously feeds pressure medium towards the wheel brakes and the drive direction of which is not reversed. The pressure generator does not to suck pressure medium from the wheel brakes in any operating state. With no reversal of the direction of motion being necessary, a relatively inexpensive motor can be used to drive the pressure generator.

With the vehicle brake system according to the disclosure, as before the driver gives the braking command, but the actual generation of brake pressure takes place without driver involvement, solely by a driven pressure generator. The driver is thus decoupled from the generation of brake pressure. As a result, pressure pulsations triggered by the pressure generator cannot penetrate to the driver, therefore the vehicle brake system according to the disclosure is characterized by a high level of operating comfort. With a vehicle brake system according to the disclosure, a boost of the brake pressure set by the driver takes place by suitable activation of the pressure generator drive in interaction with a pressure modulation device that is disposed hydraulically downstream of the pressure generator. The pressure generator is in direct contact with a reservoir tank for the pressure medium. Consequently, the vehicle brake system according to the disclosure does not comprise a conventional pneumatic brake force booster and is therefore particularly useable for vehicles that are driven by an electric motor, by a hybrid drive and/or by a supercharged internal combustion engine. With said drive options, no negative pressure or only a small negative pressure, such as is necessary for pneumatic brake force boosting, is available. The vehicle brake system according to the disclosure comprises a pressure modulation device with a pressure build-up valve disposed upstream of each respective wheel brake and a pressure reducing valve disposed downstream of each respective wheel brake. According to the disclosure, at least one of the pressure reducing valves of the wheel brakes of a brake circuit is in the form of a continuously regulated valve (regulating valve). Such a continuously regulated pressure reducing valve can be changed from a normal position into an end position via any number of intermediate positions. The pressure reducing valve connects the wheel brake to a reservoir tank and owing to the controllability thereof enables particularly sensitive adjustment of the brake pressure in the associated brake circuit. With this type of brake pressure adjustment, a comprehensive blending of hydraulic and electrical braking torques is possible until the vehicle is at a standstill, without the pressure pulsations that are triggered by the pressure generator being noticeable by the driver or the other occupants of the vehicle in doing so.

Further advantages or advantageous developments of the disclosure are revealed by the claims and/or by the following description.

The reference characters that are employed have been used consistently for mutually corresponding components in the figures and in the following description. The latter describes the individual exemplary embodiments in detail.

DETAILED DESCRIPTION

Figure 1:
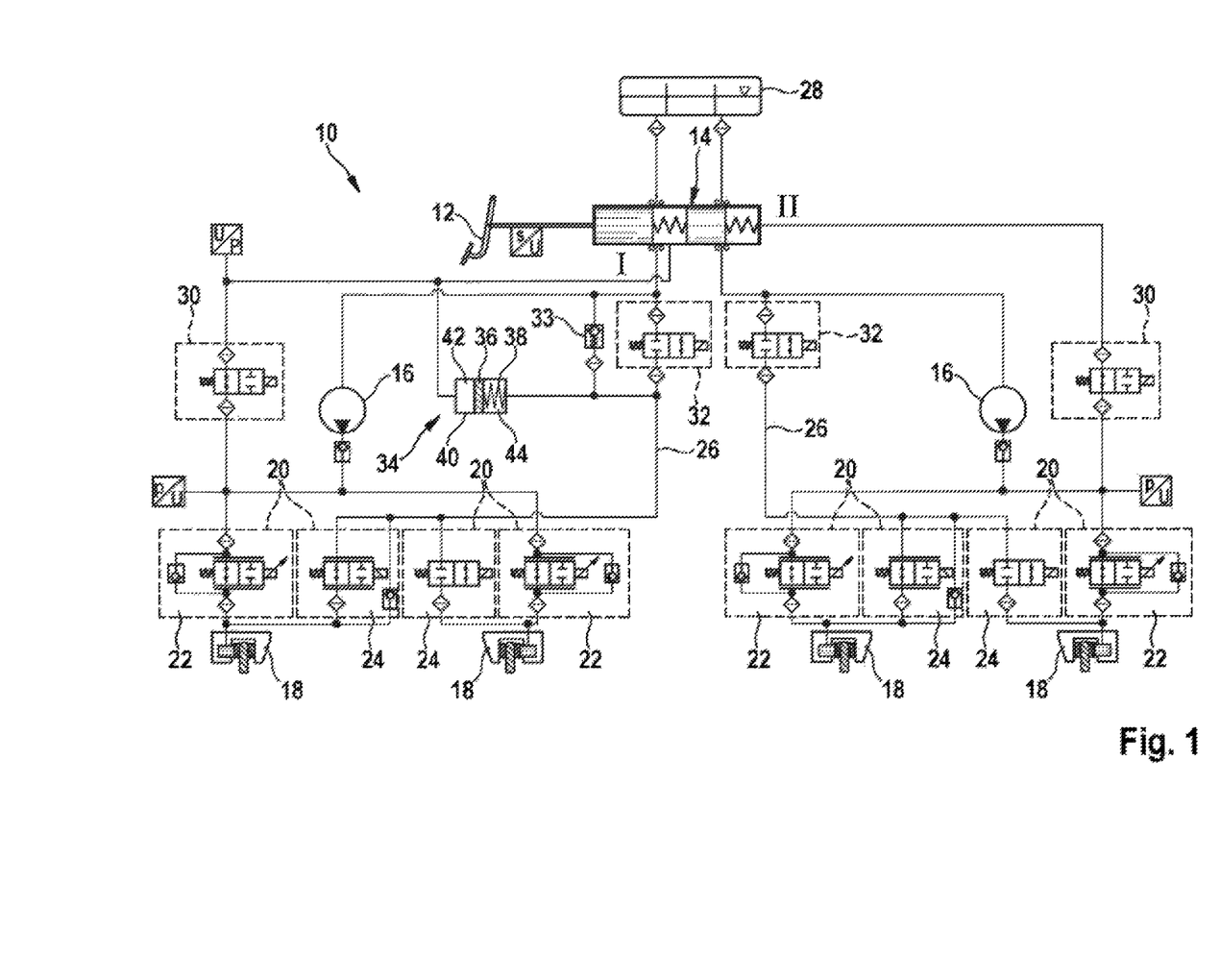
FIGS. 1-6 illustrate different exemplary embodiments of a hydraulic circuit diagram for a vehicle brake system according to this disclosure using hydraulic circuit symbols of the individual components that are connected to each other.

The vehicle brake system 10 according to the disclosure and according to FIG. 1 is fitted with a master brake cylinder 14 operated by a pedal 12 and is divided into an auxiliary brake system and an operating brake system that is independent thereof. The vehicle brake system 10 can accordingly be changed over from an auxiliary braking mode into an operating braking mode. Said operating modes differ from each other inter alia in the manner of generation of the brake pressure. In the auxiliary braking mode, only the driver generates the brake pressure by muscle force by suitable operation of the master brake cylinder 14, whereas in the operating braking mode the driver only gives a braking command by operation of the master brake cylinder 14, but the actual generation of brake pressure is carried out by a pressure generator 16 that is driven by external power. In the normal state, i.e. if all subsequently described components of the vehicle brake system 10 are working properly, the vehicle brake system 10 is in the operating braking mode; the auxiliary braking mode is only activated in the event of a malfunction, i.e. if at least one of said components should not be operating properly or if there is a fault in the activation electronics.

Two mutually isolated brake circuits I; II are connected to the master brake cylinder 14 in the exemplary embodiment. The two brake circuits I; II are of essentially identical designs to each other; any differences that exist being dealt with in the following. Each of the brake circuits comprises two wheel brakes 18. A respective pressure modulation device 20 that is associated with each wheel brake 18 adjusts the wheel brake pressure and adapts the pressure to the slip conditions prevailing at the wheel of the vehicle associated with the wheel brake. Said pressure modulation device 20 consists of a pressure build-up valve 22 controlling the flow of pressure medium to the respective wheel brake 18 and a pressure reducing valve 24 determining a flow of pressure medium out of the respective wheel brake 18. The pressure build-up valve 22 is connected in the brake circuit I; II upstream of the wheel brake 18 and controls the pressure medium connection of the wheel brake 18 to one of the pressure sources that are present, i.e. to the pressure generator 16 or to the master brake cylinder 14 depending on the operating mode of the vehicle brake system 10. In contrast, the pressure reducing valve 24 is located downstream of the wheel brake 18 in the brake circuit I; II and regulates a pressure medium connection of the wheel brake 18 to a return line 26. The pressure medium flows back via the return line 26 to a reservoir tank 28. The pressure build-up valve 22 and the pressure reducing valve 24 each comprise two pressure medium ports and two valve positions and thus form so-called 2/2-way valves. In one valve position there is a hydraulic connection between the pressure medium ports, and in the respective other valve position said hydraulic connection is interrupted or blocked. The pressure build-up valves 22 of the pressure modulation devices 20 are each implemented so as to be controllable, which means that they can be changed by suitable electronic activation from one valve position into the respective other valve position in infinitely many intermediate stages. The design of the pressure reducing valves 24 will be dealt with in detail at a later point in the description.

A changeover valve 30 is disposed between the master brake cylinder 14 and the pressure build-up valve 22. Said changeover valve 30 is a solenoid valve with two pressure medium ports that can be changed by electronic activation from the normally open position thereof into a blocking position. In the blocking position the pressure medium connection of the master brake cylinder 14 to the wheel brakes 18 of the associated brake circuit I; II is interrupted, so that no brake pressure can be built up in the wheel brakes of said brake circuit I; II by operation of the master brake cylinder 14. The changeover valve 30 is in the blocking position if the vehicle brake system 10 is operating properly in the operating brake state or if the auxiliary brake is inoperable.

According to the disclosure, a so-called simulator control valve 32 is disposed in the return line 26 between the pressure reducing valve 24 and the reservoir tank 28. Said simulator control valve 32 also comprises two pressure medium ports, but in contrast to the changeover valve 30, in the normal position thereof it adopts a blocking position and can be changed over by electronic activation into a conducting position. This means that the simulator control valve 32 is switched to conduct in the operating brake state of the vehicle brake system, so that pressure medium can be displaced to the reservoir tank 28 for pressure medium by a pedal travel simulator 34. Said pedal travel simulator 34 is located in a pressure medium channel that branches off from the brake circuit I; II between the master brake cylinder 14 and the changeover valve 30. The pedal travel simulator 34 enables the representation of a pedal travel during the operating brake mode of the vehicle brake system 10, despite the pressure medium connection between the master brake cylinder 14 and the wheel brakes 18 of the brake circuit I; II being blocked in said mode. Moreover, the pedal travel simulator 34 provides the driver with haptic feedback regarding his operation of the pedal 12. Only the brake circuit I is fitted with a pedal travel simulator 34.

The pedal travel simulator 34 comprises a simulator piston 36, which is accommodated in a cylinder 40 so as to be displaceable against the force of an elastic piston restoring element 38. A characteristic of the pedal reaction can be adjusted by means of the design of the piston restoring element 38. The simulator piston 36 divides the interior of the cylinder 40 into two pressure chambers 42, 44. The elastic piston restoring element 38, which is preferably in the form of a spring, in particular a spiral spring, is disposed in one of said two pressure chambers 42, 44. Said pressure chamber 44 comprising the piston restoring element 38 is terminated at the return line 26. The relevant connection point is disposed upstream of the simulator control valve 32 and downstream of the pressure reducing valve 24 of the wheel brakes 18 of the brake circuit I. With the changeover valve 30 blocked, the pressure medium displaced from the master brake cylinder 14 flows into the pressure chamber 42 facing towards the master brake cylinder 14 and as a result forces the simulator piston 36 to move against the restoring force of the piston restoring element 38. If the simulator control valve 32 that is disposed downstream adopts the conducting position thereof, i.e. if the vehicle brake system 10 is in the operating braking mode, pressure medium can be displaced from the pedal travel simulator 34 out of the rear pressure chamber 44 accommodating the piston restoring element 38 to the reservoir tank 28.

A displacement of pressure medium is not possible and the pedal travel simulator 34 is as a result not able to receive pressure medium if the simulator control valve 32 adopts the blocking or normal position, i.e. if the vehicle brake system 10 is in the auxiliary braking mode. In this case, the pressure medium displaced from the master brake cylinder 14 operated by the driver flows to the connected wheel brakes 18, bypassing the pedal travel simulator 34, and causes a build-up of brake pressure there. Said build-up of brake pressure is thus carried out by the muscle power of the driver.

In parallel with the simulator control valve 32, a non-return valve 33 is connected between the reservoir tank 28 and the pressure chamber 44 of the pedal travel simulator 34 accommodating the piston restoring element 38. The non-return valve 33 is conducting for pressure medium in the direction of flow from the reservoir tank 28 to the pedal travel simulator 34 and blocks the corresponding opposite direction. Following the completion of retraction of the operation of the pedal 12 of the master brake cylinder 14, the non-return valve allows a rapid return flow of pressure medium from the reservoir tank 28 into the pressure chamber 44, so that the simulator piston 36 can be brought back into the normal position by the piston restoring element 38 thereof. In the normal position of the simulator piston 36, the pressure chamber 42 of the pedal travel simulator 34 is emptied.

Apart from said functions of the pedal travel simulator 34, the simulator control valves 32 can also be used to protect the brake circuits I; II. Said functionality is necessary if, as with the exemplary embodiment of the disclosure according to FIG. 1, for cost reasons pressure modulation devices 20 are used that are fitted with a continuously regulated pressure reducing valve 24 per brake circuit I; II that is designed from the construction viewpoint as a normally open valve. Without the simulator control valve 32, in the event of a malfunction of the vehicle brake system there would be a hydraulic connection for the pressure medium between the brake circuits I; II and the reservoir tank 28 via the then open pressure reducing valve 24, which would prevent the build-up of brake pressure in the relevant brake circuit I; II by the operation of the auxiliary brake system.

As already mentioned, the build-up of brake pressure in the wheel brakes 18 is carried out system by means of external power during the operating braking mode of the vehicle brake. For this purpose, the vehicle brake system is fitted with a motorized pressure generator 16, the drive of which can be activated when required. According to the disclosure, a displacement pump, in particular a gear pump, is used as the pressure generator 16, which when in the driven state sucks pressure medium out of the reservoir tank 28 and feeds the pressure medium continuously towards the wheel brake 18. On the suction side, for this purpose the pressure generator 16 is connected to the return line 26 between the reservoir tank 28 and the simulator control valve 32, whereas on the pressure side it is connected to the brake circuit I; II downstream of the changeover valve 30 and upstream of the pressure build-up valve 22 of the pressure modulation device 20. A reversal of the direction of rotation of the drive of the pressure generator 16 is not provided; the pressure generator 16 does not suck any pressure medium out of the wheel brake 18 and does not transport any pressure medium away from the wheel brake 18.

As already mentioned, the pressure build-up valves 22 of the pressure modulation devices 20 of the brake circuits I; II are implemented as normally open regulating valves with two pressure medium ports each and can be changed into a blocking position via any number of intermediate positions by suitable electronic activation. During normal braking processes, the pressure build-up valves 22 are usually not activated electronically and remain in the normal positions thereof, which ensures a very rapid and substantially unchoked build-up of brake pressure in the wheel brakes 18. An adaptation of the brake pressure in the wheel brakes 18 to the ambient conditions is carried out by means of the pressure reducing valves 24 of the brake circuit I; II. According to the disclosure, at least one of said pressure reducing valves 24 within a brake circuit I; II is of a continuously regulated form for this purpose. It is implemented as a normally open solenoid valve with two pressure medium ports and can be changed from the open position thereof in any number of intermediate steps into the blocking position thereof. By adjustment of the electronic activation of the pressure reducing valve 24, the cross-section of the pressure medium connection between the wheel brake 18 and the return line 26 or the reservoir tank 28 can be adjusted extremely precisely and sensitively in this way, and hence the pressure level in the wheel brakes 18 can be regulated accordingly. Consequently, different components of braking torque within the vehicle brake system 10 can be fully blended with each other until the vehicle is at a standstill.

As can be seen from FIG. 1, it is sufficient to implement only one of the pressure reducing valves 24 of a brake circuit I; II as continuously regulated, whereas the pressure modulation device 20 of the respective other wheel brake 18 of the same brake circuit I; II is by contrast provided with a conventional pressure reducing valve 24. "Conventional" means in this context that said pressure reducing valve 24 is implemented as a normally closed switching valve, such as occur widely in the marketplace, and owing to the simpler construction thereof can be procured significantly less expensively than a regulating valve.

In the case of the exemplary embodiment according to FIG. 1, the pressure modulation devices 20 of both brake circuits I; II are fitted identically to each other with solenoid valves and indeed in common with regulated pressure build-up valves 22 as well as with a continuously regulated pressure reducing valve and a switchable pressure reducing valve 24 in each case.

Regulation of the ride stability of a vehicle is simplified if pressure modulation devices 20 fitted with solenoid valves are commonly provided at least for each axle of the vehicle. This consequently means that the brake circuits I; II of the vehicle brake system 10 according to FIG. 1 are preferably distributed diagonally on the axles of the vehicle or that one wheel brake 18 is disposed in a brake circuit on one side of the vehicle on one axle of the vehicle with the wheel brake 18 on the respective other side of the vehicle disposed on the respective other axle of the vehicle or vice-versa.

As described, the pressure build-up valves 22 adopt the open position thereof in the non-activated state (normal position). Only if a sensor arrangement that is provided for this purpose determines that one of the wheels of the vehicle is tending to lock, an electronic activation of the associated pressure build-up valve 22 takes place in order to close said valve and to prevent a further rise of the brake pressure of the associated wheel brake 18. In order to set the wheel involved back in rotation, the pressure reducing valve 24 associated with the wheel brake 18 is additionally electronically activated, so that pressure medium flows out of said wheel brake 18 to the reservoir tank 28 for the purpose of further reducing the brake pressure. The pressure build-up valves 22 of the pressure modulation device 20 are accordingly mainly necessary for the anti-lock mode of the vehicle brake system 10.

The first exemplary embodiment of a vehicle brake system according to the disclosure 10 shown in FIG. 1 comprises a total of twelve solenoid valves and thus exactly as many solenoid valves as a non-recovery-capable or blending-capable conventional slip-regulated vehicle brake system. This has at the advantage that all solenoid valves of a vehicle brake system according to the disclosure 10 can be mounted on a housing block of a hydraulic assembly (not shown), the external dimensions of which essentially correspond to the dimensions of a conventional housing block. The hydraulic assembly of a vehicle brake system according to the disclosure therefore has no additional installation space requirements in comparison to a conventional hydraulic assembly.

Figure 2:
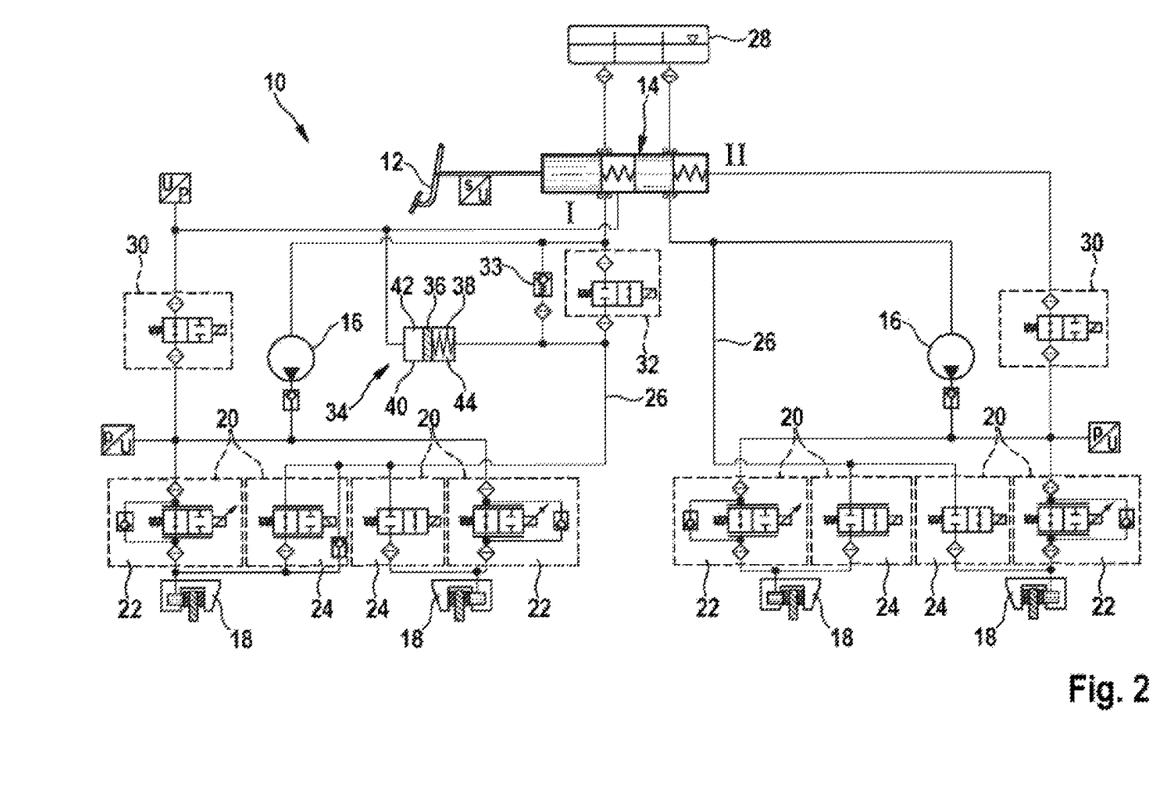

FIG. 2 shows a second exemplary embodiment of the disclosure.

The brake circuit I illustrated in FIG. 2 in the left half of the picture is for this exemplary embodiment of identical design to one of the described brake circuits I; II of the previously described exemplary embodiment according to FIG. 1. In contrast thereto, with the second brake circuit II illustrated in FIG. 2, right half of the picture, the simulator control valve has been eliminated. This was made possible by the use of a pressure modulation device 20 on a wheel brake 18 of said second brake circuit II, the continuously regulated pressure reducing valve 24 of which is now designed as a normally closed solenoid valve and no longer normally open, as with the exemplary embodiment according to FIG. 1. It is advantageous with normally closed pressure reduction valves 24 that as a result, even in the event of a malfunction of the vehicle brake system 10 no hydraulic connection can occur between the respective brake circuit II and the reservoir tank 28 that would hinder the build-up of pressure in said brake circuit II in the event of the operation of the auxiliary brake, and that the vehicle brake system 10 according to FIG. 2 therefore only comprises a total of eleven solenoid valves. However, normally closed, electronically regulated pressure reducing valves 24 are of extremely complex structure and accordingly significantly dearer than the normally open versions thereof. According to exemplary embodiment 2, the vehicle brake system 10 further comprises a total of three pressure modulation devices 20 that are differently fitted with solenoid valves, and is therefore only suitable for vehicle brake systems 10 in which the brake circuits I; II are each associated with one axle of the vehicle. A diagonal brake circuit distribution is not used for the vehicle brake system 10 according to FIG. 2 owing to the more complex controllability of the ride stability of the vehicle.

Figure 3:
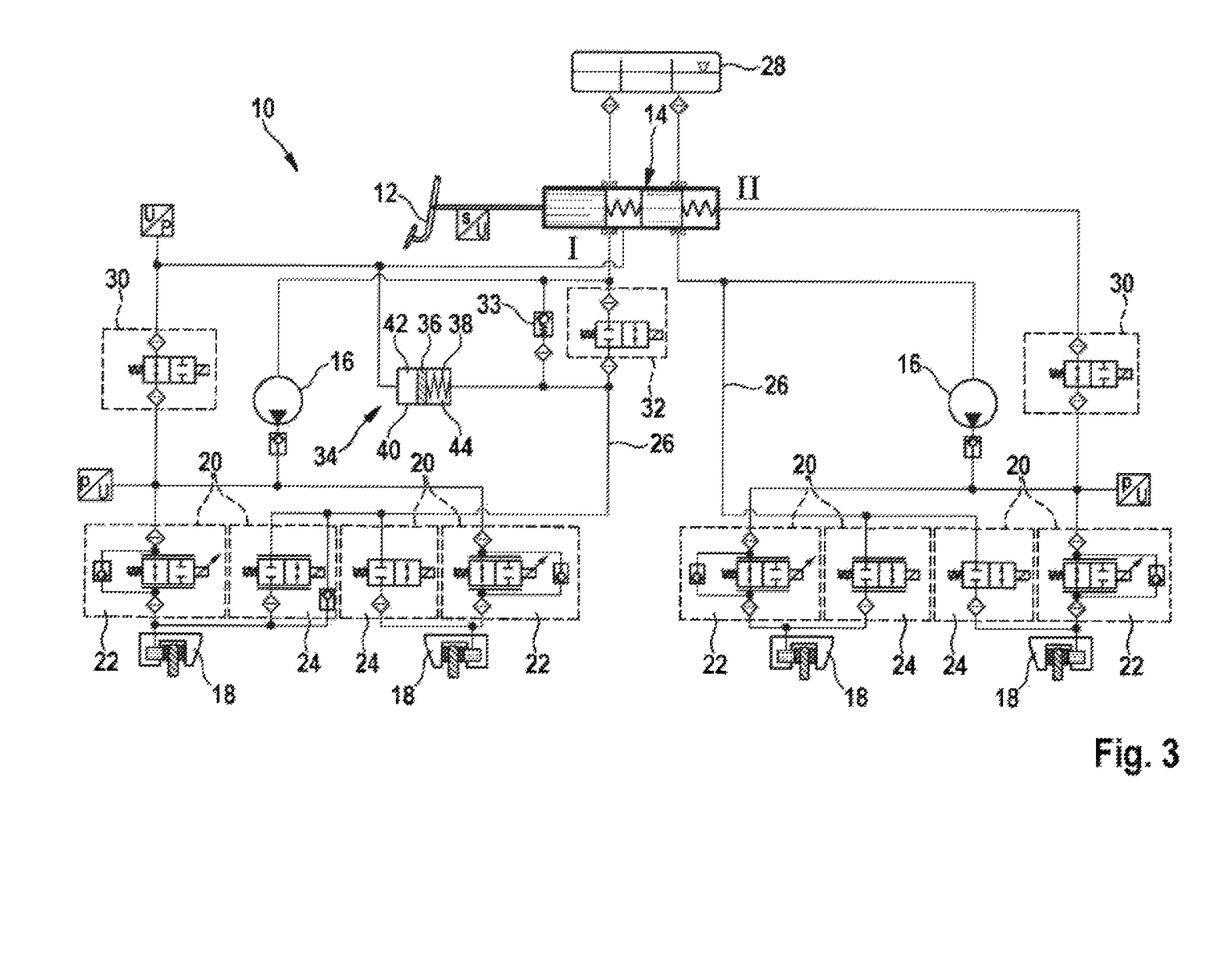

The last-mentioned limitation no longer exists with the exemplary embodiment according to FIG. 3. Both brake circuits I; II are fitted with two pressure modulation devices 20 each here, which are indeed fitted with different solenoid valves, but are still the same in terms of the brake circuit. As a result, said vehicle brake system 10 is equally suitable for a parallel and also for a diagonal distribution of the brake circuits I; II on the axles of the vehicle. The continuously regulated pressure reducing valves 24 of each brake circuit I; II are in the form of normally closed regulating valves. Said valve type is indeed of a more complex construction and hence dearer than the normally open design, but has the advantage that a separate protection of the brake circuits I; II by simulator control valves 32 (FIG. 1) can be dispensed with, as even in the event of a malfunction there is no open pressure medium connection of one of the brake circuits I; II to the reservoir tank 28. The simulator control valve 32 still present in one of the two brake circuits with said exemplary embodiment is used only for control, i.e. for activation or deactivation of the pedal travel simulator 34 in the operating brake mode or in the auxiliary brake mode of the vehicle brake system 10. Regarding the unregulated pressure reduction valves 24, inexpensive, normally closed switching valves are used in both brake circuits I; II with this exemplary embodiment, as also with previous exemplary embodiments.

Figure 4:
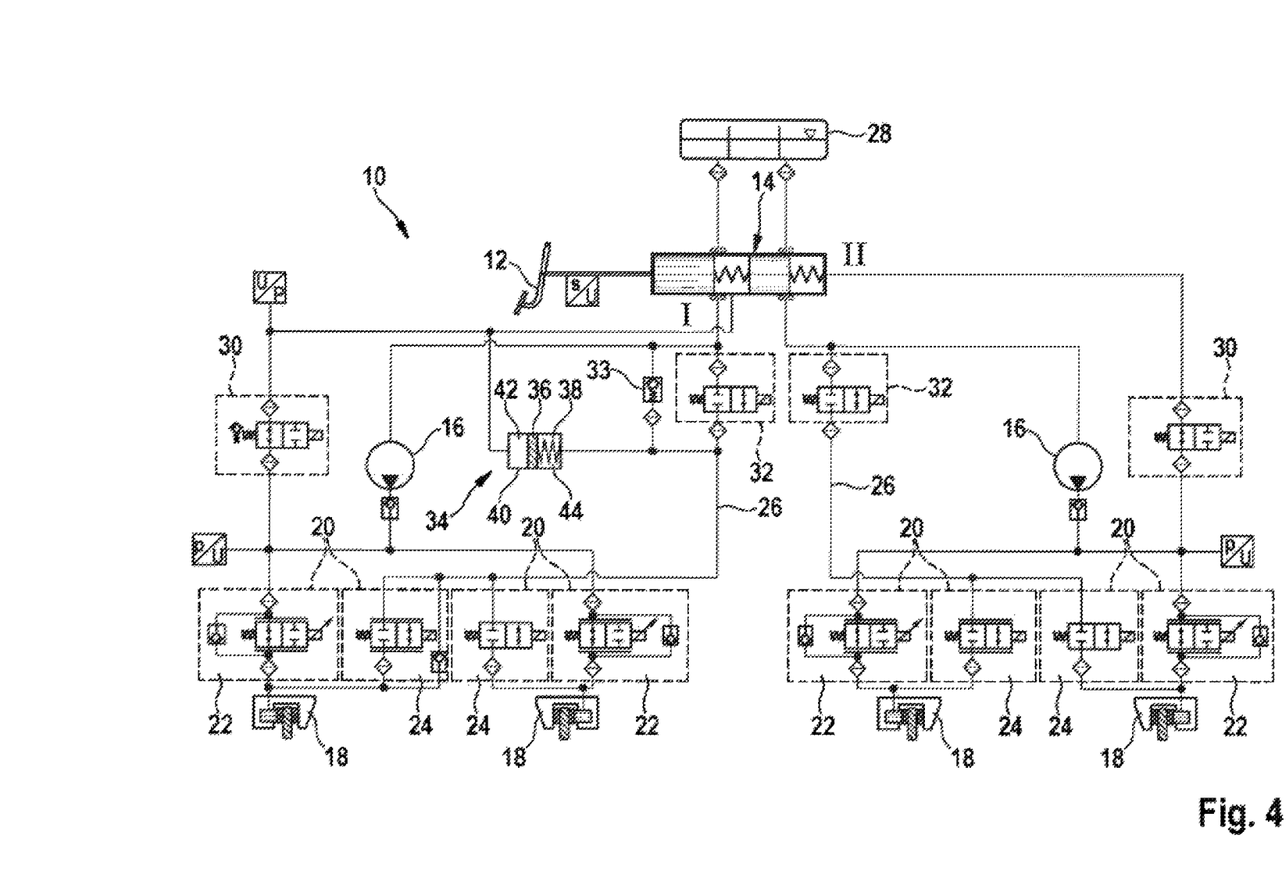

As the exemplary embodiment according to FIG. 4 shows, notwithstanding the above implementations for the simulator valve 32 only in brake circuit I, simulator control valves 32 can be provided for both brake circuits I; II, for example in order to protect both brake circuits I; II against failure separately from each other. A failure scenario could for example consist of the continuously regulated pressure reducing valve 24 or the simulator control valve 32 not returning to the closed position thereof or leaking, for example owing to a mechanical defect or fouling.

Figure 5:
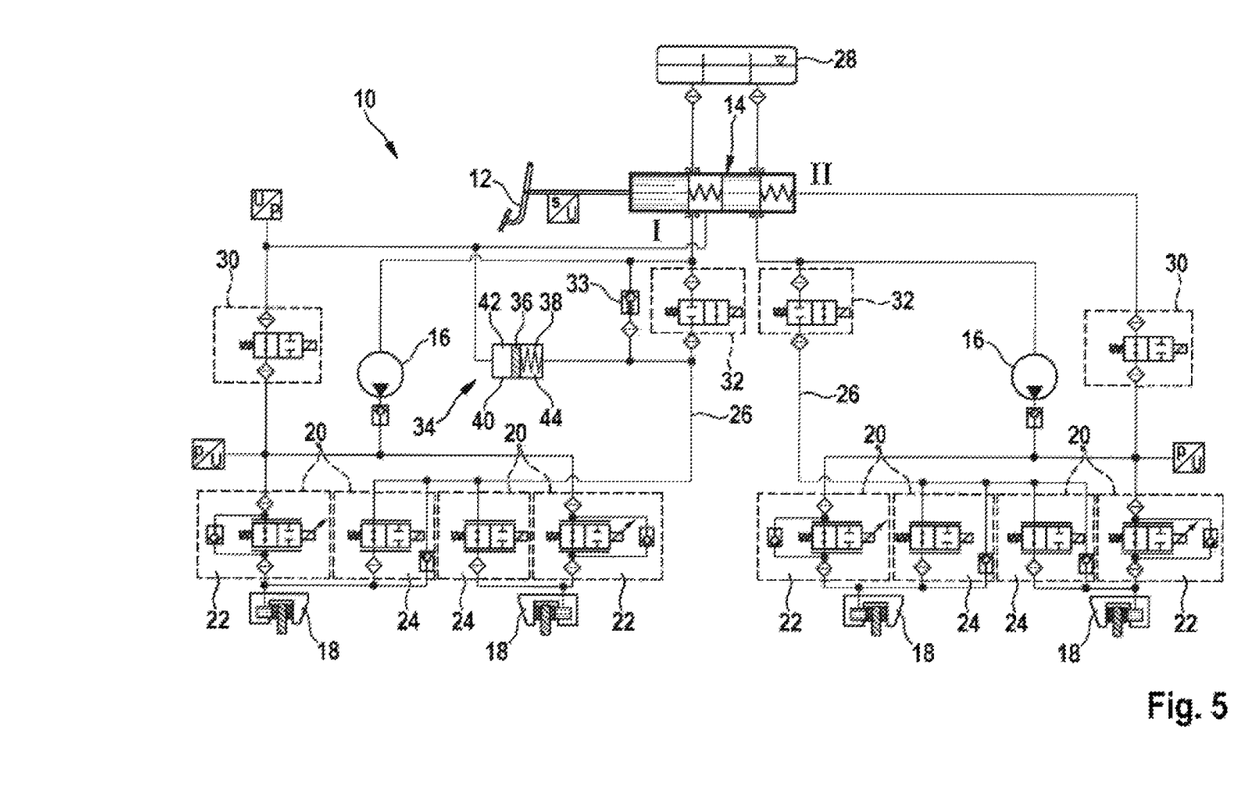

With the exemplary embodiment according to FIG. 5, all the pressure modulation devices 20 provided are each fitted with solenoid valves in the same way, regardless of the assignment thereof to one of the brake circuits I; II. Each pressure modulation device 20 comprises a regulated, normally open pressure build-up valve 22 as well as a likewise regulated, normally open pressure reducing valve 24. In other words, as a result all pressure build-up valves 22 that are present and all pressure reducing valves 24 are implemented to be controllable. Protection of the brake circuits I; II against failure is carried out by a simulator control valve 32 disposed in each return line 26 of the respective brake circuit I; II and implemented to be normally closed. Said fitting of the pressure modulation devices 20 with solenoid valves has the advantage of being equally suitable for vehicle brake systems 10 with brake circuits I; II distributed diagonally on the axles and also for vehicle brake systems 10 with brake circuits I; II distributed in parallel on the axles. However, a total of twelve solenoid valves is necessary for controlling vehicle brake system equipped in this way.

In the operating brake state of said vehicle brake system 10, the simulator control valves 32 are energized in each braking process and as a result are changed over from the closed position thereof into the conducting position thereof. In the case of a parallel distribution of the brake circuits I, II on the axles of the vehicle, the activation of the simulator control valves 32 can be made dependent on the speed at which the pedal 12 is depressed by the driver. If the operation of the pedal is carried out faster than a definable limit value, activation of the simulator control valve 32 can take place such that said simulator control valve 32 is opened with a delay. Said delayed opening causes a pressure rise in the return line 26, which acts on the wheel brakes 18 via the opened pressure build-up valve 24, and as a result allows the muscle power of the driver to be used for a more rapid build-up of pressure in said wheel brakes 18 during rapid initial braking processes in the operating braking mode. The pressure difference occurring at the piston surfaces of the simulator piston 36 can be limited in this way to values such as are known from normal braking processes.

Figure 6:
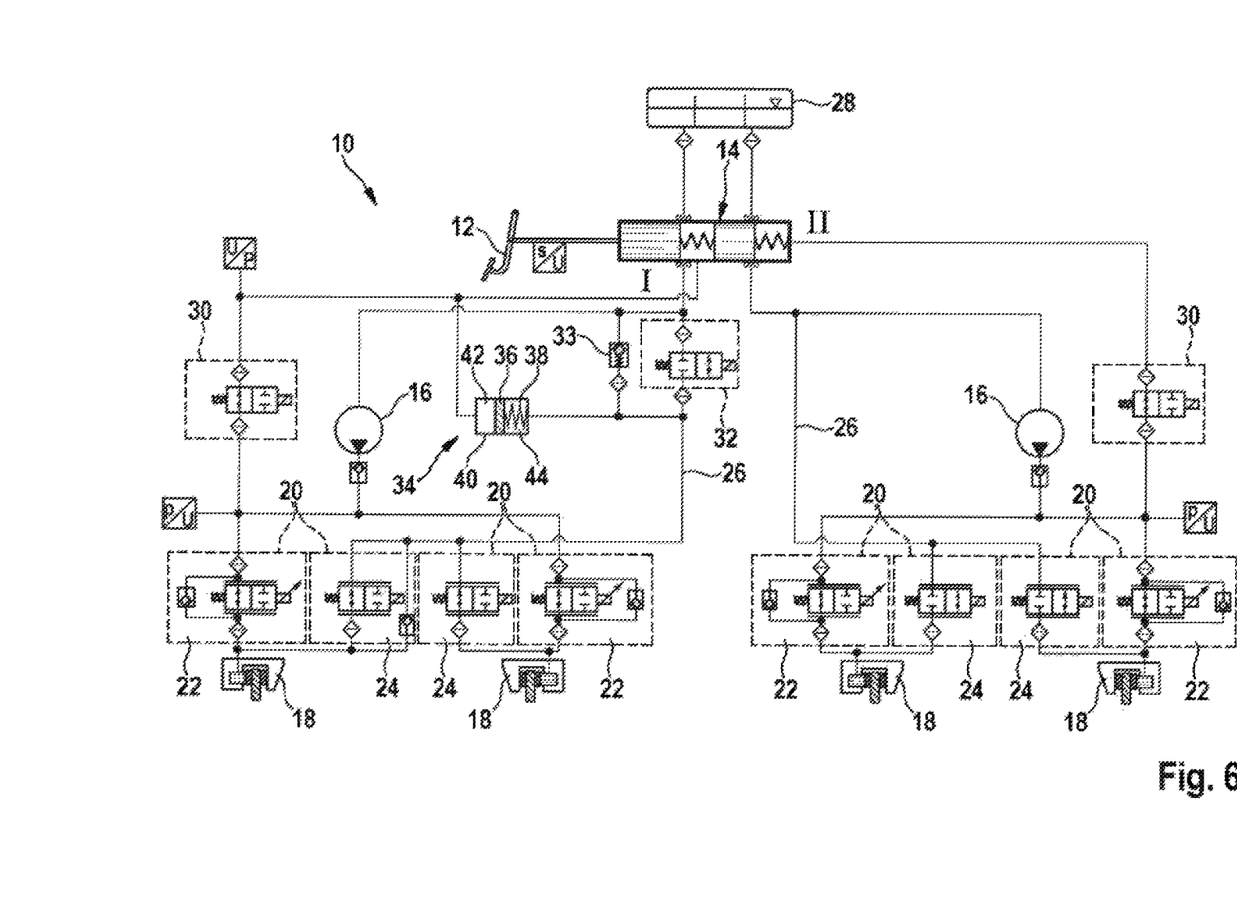

The exemplary embodiment according to FIG. 6 is equipped with pressure modulation devices 20 that are fitted with solenoid valves uniformly relative to each other depending on the assignment thereof to one of the brake circuits I; II. In brake circuit I, the continuously regulated pressure reducing valves 24 are implemented as normally open regulating valves, and normally closed regulating valves are uniformly used in the respective other brake circuit II. As the latter in the normal position thereof block a pressure medium connection of the associated wheel brakes 18 thereof to the reservoir tank 28, said brake circuit II requires no additional protection by means of a simulator control valve 32, whereas the brake circuit I that is fitted with the normally open pressure reduction valves 24 is fitted with such a simulator control valve 32 as before. Said simulator control valve 32 is, however, necessary anyway for the simulation of pedal travel while the vehicle brake system 10 is in the operating braking mode.

Owing to the differently equipped pressure modulation devices 20, said exemplary embodiment is also only suitable for vehicle brake systems 10 with parallel distribution of the brake circuits I; II on the axles of the vehicle. However, with the exemplary embodiment according to FIG. 6, activation of the simulator control valve 32 can be implemented depending on the speed of operation of the pedal, as described in connection with the exemplary embodiment according to FIG. 5.

Of course, changes or additions to the described exemplary embodiments are conceivable without departing from the basic idea of the disclosure.

Each one of the pressure modulation devices 20 of a brake circuit I; II is, as described, equipped with at least one continuously regulated pressure reducing valve 24. Using said continuously regulated pressure reducing valve 24, it is possible to regulate the brake pressure in one of the associated wheel brakes 18 particularly sensitively and precisely, which in turn allows full blending of any components of braking torque occurring within a vehicle brake system 10. Finally, as a result the use of a pressure generator 16 that continuously feeds pressure towards the wheel brakes in the driven state is possible. Such pressure generators 16 themselves are known from conventional, non-recovering vehicle brake systems 10 and are therefore available particularly inexpensively.

The simulator control valve 32 that is present in at least one of the brake circuits I; II is according to the disclosure connected in the return line 26 of said brake circuit I; II, and indeed downstream of a point at which the pressure chamber 44 of the pedal travel simulator 34 that is fitted with the piston restoring element 38 is connected to said return line 26. The simulator control valve 32 is accordingly installed downstream of the pedal travel simulator 34 and thus protects the pressure reducing valves 24 of the at least one brake circuit I; II. Besides the control of the pedal travel simulator 34, the simulator control valve 32 thus also protects the brake circuit or circuits against failure. Even in the event of a malfunction or in the auxiliary brake mode of the vehicle brake system 10, a brake pressure can therefore be built up in the wheel brakes 18 by the driver using muscle power.

What is claimed is:

1. An electronically slip-regulated vehicle brake system, comprising:
    an operating brake including a pressure generator that is drivable via external power, and that is configured to produce an operating brake pressure in an operating brake mode;
    an auxiliary brake including a master brake cylinder that is operable via muscle power, and that is configured to produce an auxiliary brake pressure in an auxiliary brake mode;
    a device configured to change the vehicle brake system from the operating brake mode into the auxiliary brake mode;
    a brake circuit that is connected to the master brake cylinder, and that includes:
        a return line that forms a pressure medium connection from at least one wheel brake to a reservoir tank; and
        a pressure reducing valve disposed in the return line and configured to control the pressure medium connection to regulate the operating brake pressure during the operating brake mode;
    a pedal travel simulator that is configured to simulate an operating travel of the master brake cylinder during the operating brake mode, and that includes a first pressure chamber and a second pressure chamber, the second pressure chamber connected to the return line of the brake system at a first position along the return line; and
    a simulator control valve disposed in the return line of the brake circuit at a second position downstream of the first position, and configured to control a flow of pressure medium from the master brake cylinder into the first pressure chamber of the pedal travel simulator.

2. The electronically slip-regulated vehicle brake system according to claim 1, wherein the simulator control valve includes a switching valve configured to switch from a normal position in which the switching valve is closed to a conducting position via electronic activation.

3. The electronically slip-regulated vehicle brake system according to claim 1, wherein the pressure reducing valve includes a continuously regulated solenoid valve that is switchable between a normal position in which the solenoid valve is open and an end position in which the solenoid valve is closed.

4. The electronically slip-regulated vehicle brake system according to claim 1, wherein the pressure generator includes a displacement pump that is drivable to suck pressure medium directly out of the reservoir tank and feed the pressure medium toward the wheel brake.

5. The electronically slip-regulated vehicle brake system according to claim 4, wherein the pressure generator further includes a gear pump.

6. The electronically slip-regulated vehicle brake system according to claim 1, wherein the pedal travel simulator further includes:
   a simulator piston that separates the first pressure chamber from the second pressure chamber; and
   an elastic piston restoring element that is disposed in the second pressure chamber, and that is configured to operate the simulator piston.

7. The electronically slip-regulated vehicle brake system according to claim 1, further comprising:
   a pressure modulation device that includes at least one continuously regulated pressure reducing valve, wherein:
      the brake circuit includes a plurality of wheel brakes; and
      at least one of the plurality of wheel brakes is associated with the pressure modulation device.

8. The electronically slip-regulated vehicle brake system according to claim 1, wherein:
   the vehicle brake system comprises a plurality of brake circuits;
   each brake circuit includes a plurality of wheel brakes and a pressure modulation device having at least one continuously regulated pressure reducing valve, the continuously regulated pressure reducing valves of the plurality of brake circuits being of a same type.

\* \* \* \* \*